(12) United States Patent
Klinefelter

(10) Patent No.: US 9,643,196 B2
(45) Date of Patent: May 9, 2017

(54) ROTARY SPRINKLER AND WATERING METHOD

(71) Applicant: Irrigreen, Inc., Edina, MN (US)

(72) Inventor: Gary Klinefelter, Eden Prairie, MN (US)

(73) Assignee: Irrigreen, Inc., Edina, MN (US)

( * ) Notice: Subject to any disclaimer, the term of this patent is extended or adjusted under 35 U.S.C. 154(b) by 230 days.

(21) Appl. No.: 14/384,472

(22) PCT Filed: Mar. 14, 2013

(86) PCT No.: PCT/US2013/031503
§ 371 (c)(1),
(2) Date: Sep. 11, 2014

(87) PCT Pub. No.: WO2013/151724
PCT Pub. Date: Oct. 10, 2013

(65) Prior Publication Data
US 2015/0129673 A1   May 14, 2015

Related U.S. Application Data

(60) Provisional application No. 61/621,125, filed on Apr. 6, 2012.

(51) Int. Cl.
*B05B 3/02* (2006.01)
*B05B 12/02* (2006.01)
(Continued)

(52) U.S. Cl.
CPC ............... *B05B 3/02* (2013.01); *A01G 25/16* (2013.01); *B05B 3/021* (2013.01); *B05B 12/02* (2013.01);
(Continued)

(58) Field of Classification Search
CPC .... B05B 1/16; B05B 1/30; B05B 3/02; B05B 3/021; B05B 12/02; B05B 12/04;
(Continued)

(56) References Cited

U.S. PATENT DOCUMENTS 1,102,354 A * 7/1914 Pougnet ................ B05B 15/069
239/536
5,280,854 A * 1/1994 Das ........................ B05B 3/021
239/227
(Continued)

FOREIGN PATENT DOCUMENTS

DE    102005058798 A1    6/2007
WO       2004064498 A1    8/2004
(Continued)

OTHER PUBLICATIONS

First Examination Report for Australian Patent Application No. 2013243915, dated Jun. 22, 2015.
(Continued)

*Primary Examiner* — Arthur O Hall
*Assistant Examiner* — Cody Lieuwen
(74) *Attorney, Agent, or Firm* — Brain D. Kaul; Westman, Champlin & Koehler, P.A.

(57) ABSTRACT

In a method of controlling a rotary sprinkler, a first angular position and a first watering distance are accessed from memory using a controller. A first electric motor is driven using the controller based on the first angular position. A head comprising at least one nozzle is rotated to the first angular position responsive to driving a first electric motor. A second electric motor is driven using the controller based on the first watering distance. A valve is positioned in a first valve position responsive to driving a second electric motor. Water is discharged through the valve and the at least one (Continued)

nozzle. The head is held at the first angular position for a first time period based on the first watering distance.

12 Claims, 10 Drawing Sheets

(51) Int. Cl.
   *B05B 12/08* (2006.01)
   *B05B 12/04* (2006.01)
   *B05B 12/12* (2006.01)
   *B05B 1/16* (2006.01)
   *B05B 1/30* (2006.01)
   *A01G 25/16* (2006.01)

(52) U.S. Cl.
   CPC .............. *B05B 12/04* (2013.01); *B05B 12/08* (2013.01); *B05B 12/085* (2013.01); *B05B 12/124* (2013.01); *B05B 1/16* (2013.01); *B05B 1/30* (2013.01)

(58) Field of Classification Search
   CPC ..... B05B 12/08; B05B 12/082; B05B 12/085; B05B 12/12; B05B 12/122; B05B 12/124; A01G 25/16
   USPC ..... 239/7, 67–70, 73, 74, 97, 203–206, 232, 239/246, 248, 263.1, 436, 443, 560, 561, 239/566, 581.1, DIG. 1
   See application file for complete search history.

(56) References Cited

U.S. PATENT DOCUMENTS

| | | | | |
|---|---|---|---|---|
| 5,769,322 | A * | 6/1998 | Smith | B05B 1/14 239/236 |
| 7,590,471 | B2 | 9/2009 | Jacobsen et al. | |
| 7,917,249 | B2 | 3/2011 | Jacobsen et al. | |
| 2002/0125338 | A1* | 9/2002 | Collins | B05B 3/02 239/69 |
| 2007/0221750 | A1* | 9/2007 | Roberts | A01G 25/16 239/200 |
| 2010/0044465 | A1* | 2/2010 | Lichte | A01G 27/00 239/203 |
| 2011/0049260 | A1* | 3/2011 | Palmer | A01G 25/16 239/63 |
| 2012/0018532 | A1* | 1/2012 | Nelson | B05B 3/021 239/225.1 |

FOREIGN PATENT DOCUMENTS

| | | |
|---|---|---|
| WO | 2012012318 A2 | 1/2012 |
| WO | 2013151724 A1 | 10/2013 |

OTHER PUBLICATIONS

EPO Communication from corresponding EP Application No. 13716503.1, dated Nov. 19, 2014.
International Search Report and Written Opinion of PCT/US2013/031503 mailed Jun. 25, 2013.

* cited by examiner

ROTARY SPRINKLER AND WATERING METHOD

CROSS-REFERENCE TO RELATED APPLICATION

This application is a Section 371 National Stage Application of International Application No. PCT/US2013/031503, filed Mar. 14, 2013 and published as WO/2013/151724 A1 on Oct. 10, 2013, in English, which claims the benefit of U.S. Provisional Application Ser. No. 61/621,125, filed Apr. 6, 2012 under 35 U.S.C. §119(e). The contents of which are hereby incorporated by reference in their entirety.

FIELD

Embodiments of the invention relate to multi-nozzle rotary sprinklers, sprinkler systems and methods of controlling the sprinklers and sprinkler systems.

BACKGROUND

Irrigation sprinklers are known for watering circular patterns or arc segments of a circular pattern. Typical irrigation sprinklers discharge a single rotary water stream that is rotated in a circle around a vertical rotational axis. This water stream is thrown by a sprinkler nozzle mounted in the peripheral sidewall of the nozzle head at an upward angle relative to the horizontal to direct the water a radial distance from the nozzle.

Irrigation systems generally comprise multiple sprinklers within multiple watering zones. Each sprinkler is recessed within the ground and is fed water through underground pipes. An irrigation controller activates a zone by opening a valve that controls the flow of water through the pipes of the zone. The irrigation controller activates the zones sequentially for a predetermined period of time based on zone program instructions.

Irrigation sprinklers currently have several drawbacks. The most significant is that they spray water in circles that are overlapped between sprinklers in order to conform to complex landscape shapes. This causes excess water to be deposited in the areas where these sprinklers overlap. In many systems 50% excess water is used.

Another drawback to conventional irrigation sprinklers is that they use only a few nozzles or nozzle openings. One drawback is that some nozzles spray a fine mist close to the sprinkler which results in water evaporation due to the small droplet size. Another drawback is that some of the nozzles must water a large annular ring around the sprinkler which results in watering that is not uniform across the annular ring (i.e., in a radial direction from the nozzle). As a result, these conventional sprinklers waste water and are inflexible to landscape variations.

SUMMARY

Embodiments of the invention include a method of controlling a rotary sprinkler. In some embodiments of the method, a first angular position and a first watering distance is accessed from memory using a controller. A first electric motor is driven using the controller based on the first angular position. A head comprising at least one nozzle is rotated to the first angular position responsive to driving the first electric motor. A second electric motor is driven using the controller based on the first watering distance. A valve is positioned in a first valve position responsive to driving the second electric motor. Water is discharged through the valve and the at least one nozzle. The head is held at a first angular position for a first time period based on the first watering distance, while water is discharged through the valve and the at least one nozzle.

In some embodiments of the method, a second angular position and a second watering distance are accessed from memory using the controller. The first electric motor is driven using the controller based on the second angular position. The head is rotated to the second angular position responsive to driving the first electric motor. The second electric motor is driven using the controller based on the second watering distance. The valve is positioned in a second valve position responsive to driving the second electric motor. Water is discharged through the valve and the at least one nozzle. The head is held at the second angular position for a second time period based on the second watering distance, while discharging water through the valve and the at least one nozzle.

In some embodiments, the first watering distance is greater than the second watering distance. The second electric motor is driven using the controller based on the second watering distance before driving the first electric motor using the controller based on the second angular position.

In some embodiments of the method, a new angular position and a new watering distance corresponding to the new angular position are accessed from the memory using the controller. The first electric motor is driven using the controller based on the new angular position. The head is rotated to the new angular position responsive to driving the first electric motor using the controller based on the new angular position. The second electric motor is driven using the controller based on the new watering distance. The valve is positioned in a valve position corresponding to the new watering distance responsive to driving the second electric motor using the controller based on the new watering distance. Water is discharged through the valve and the at least one nozzle. The head is held at the new angular position for a new time period based on the new watering distance. The above steps are repeated a limited number of times to complete the watering of a watering pattern.

In some embodiments, the head is rotated 0.5-1 degree during rotations of the head from one angular position to another.

In some embodiments, the first electric motor comprises a stepper motor. In some embodiments, the second electric motor comprises a stepper motor.

In some embodiments, the head comprises at least eight nozzles. The nozzles are configured to discharge water streams at substantially the same velocity, but to different radial distances from the nozzle head based on the position of the valve. Each water stream produces a spray pattern that overlaps at least one adjoining spray pattern.

This Summary is provided to introduce a selection of concepts in a simplified form that are further described below in the Detailed Description. This Summary is not indented to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
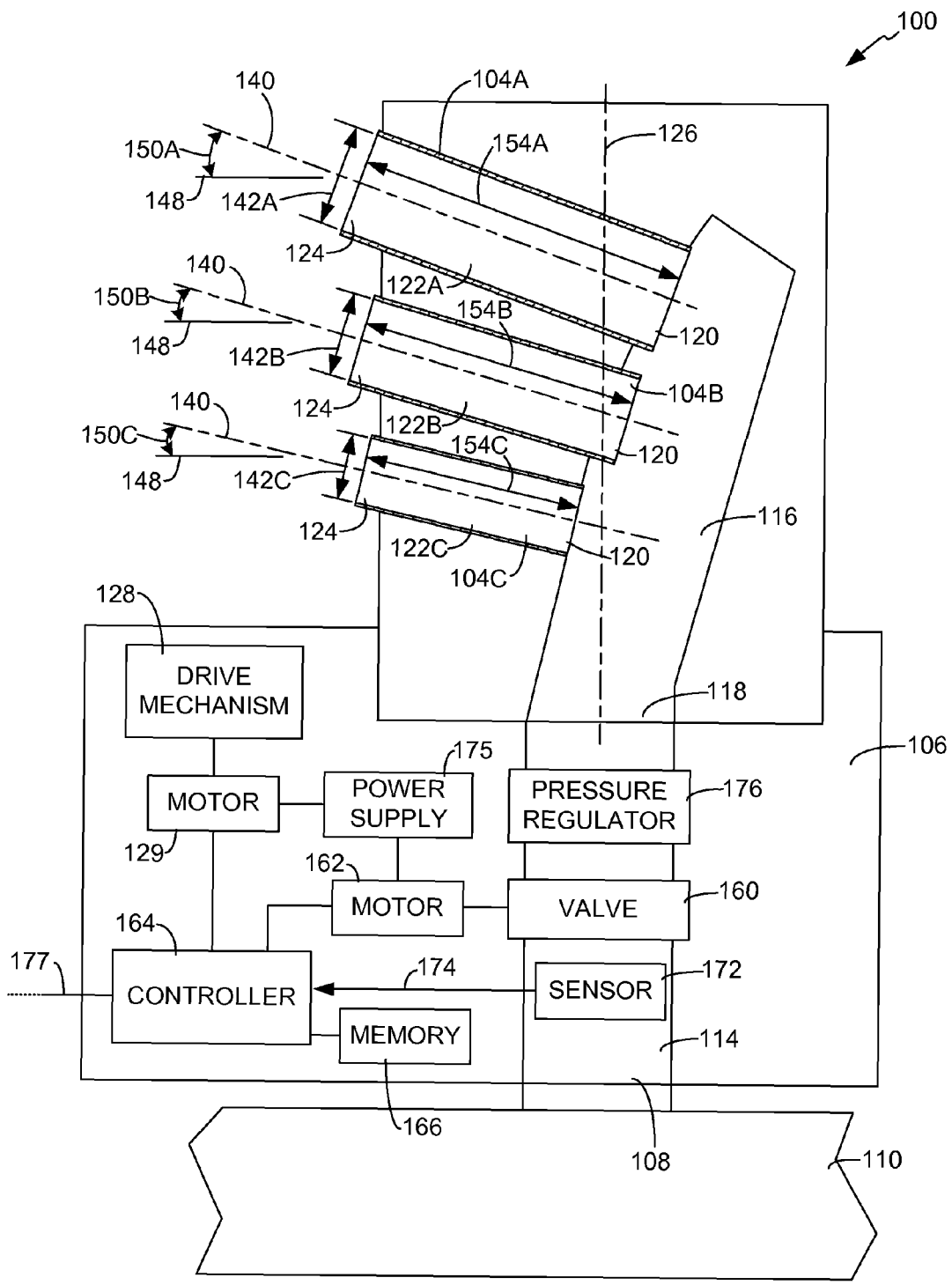
FIG. 1 is a schematic diagram of a rotary sprinkler in accordance with embodiments of the invention.

Embodiments of the invention are directed to multi-nozzle rotary sprinklers, sprinkler systems and methods. Elements depicted in the drawings having the same or similar reference correspond to the same or similar element.

FIG. 1 is a schematic diagram of a rotary sprinkler 100 in accordance with embodiments of the invention. The rotary sprinkler 100 generally comprises a nozzle head 102, a plurality of nozzles, each generally referred to as 104, and a base 106. The base 106 provides support for the nozzle head 102. The nozzle head 102 supports the plurality of nozzles 104, such as nozzles 104A-C.

While the exemplary sprinkler 100 is illustrated as including 3 nozzles 104, embodiments of the sprinkler include two or more nozzles. In one embodiment, the sprinkler 100 includes three or more nozzles. In some embodiments, the sprinkler 100 includes 4-7 nozzles, 8-14 nozzles, 8 or more nozzles, or 9 or more nozzles.

The rotary sprinkler 100 includes a water supply inlet 108 that may be coupled to a water supply line 110, such as a hose or in-ground piping. The water supply line 110 provides a pressurized source of water that is delivered to the nozzles 104 through a fluid flow path of the sprinkler 100. The fluid flow path comprises a section 114 through the base 106 and a section 116 through the nozzle head 102. The fluid flow path section 114 of the base 106 extends from the water supply inlet 108 to an inlet 118 of the nozzle head 102. The fluid flow path section 116 of the nozzle head 102 extends from the inlet 118 to inlets 120 of the nozzles 104. Each of the nozzles 104 includes a fluid pathway, generally referred to as 122, that fluidically couples the inlet 120 to an outlet 124. Accordingly, water supplied by the water supply line 110 passes through the water supply inlet 108 of the rotary sprinkler 100, the fluid flow path section 114 of the base 106, the fluid flow path section 116 of the nozzle head 102 and the fluid pathway 122 of the nozzles 104 where it is discharged through the outlet 124 of the nozzles 104 and directed to the watering area.

In one embodiment, the nozzle head 102 is configured to rotate about a vertical axis 126 relative to the base 106. In one embodiment, the rotary sprinkler 100 includes a drive mechanism 128 that is configured to drive the rotation of the nozzle head 102 about the axis 126 relative to the base 106. In one embodiment, the drive mechanism 128 comprises a motor 129, such as an electric motor (e.g., stepper motor, or a motor with an encoder) or a hydraulic motor that drives the rotation of the nozzle head 102 relative to the base 106 through a suitable gear arrangement.

In accordance with one embodiment, the rotary sprinkler 100 is designed for use as an in-ground sprinkler. In one embodiment, the base 106 is buried within the ground and the nozzle head 102 is configured to telescope out of the base 106 to a raised position when water pressure is applied to at least the inlet 118 of the nozzle head 102 for performance of a watering operation. When the water pressure is removed, the nozzle head 102 recedes within the base 106 to a lowered position, in which it is generally located at or just below the turf or grass. In one embodiment, the nozzle head 102 is biased toward the lowered position using, for example, a spring. The spring holds the nozzle head 102 within the base 106 until sufficient water pressure is applied to the inlet 118.

In one embodiment, the rotary sprinkler 100 is configured for above-ground watering operations. In accordance with this embodiment, the base 106 provides sufficient support for the nozzle head 102 such that the nozzle head 102 is maintained in a vertical orientation during the watering operation. It is not necessary for the nozzle head 102 to recede within the base 106 in this embodiment.

Figure 2:
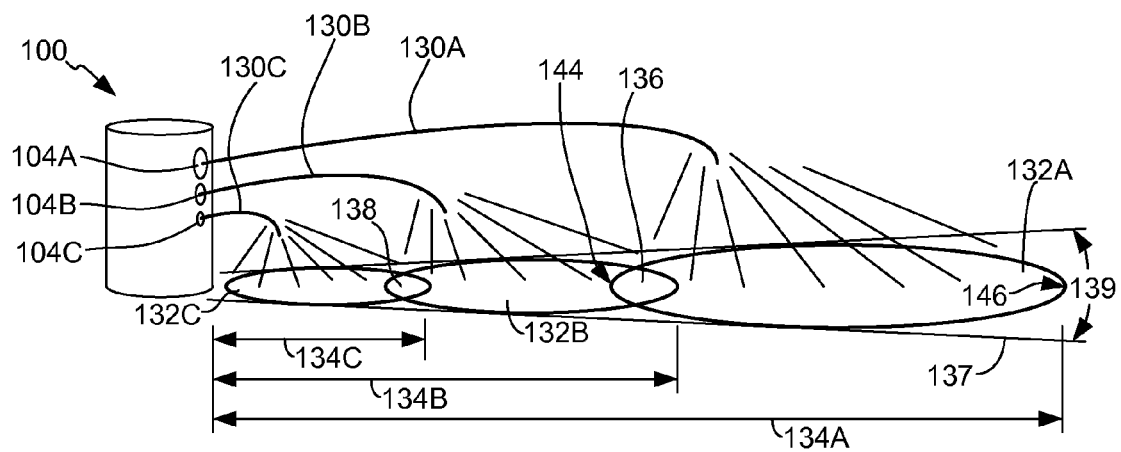
FIG. 2 is a simplified drawing illustrating exemplary water streams from a rotary sprinkler in accordance with embodiments of the invention.

In one embodiment, each of the nozzles 104 is configured to discharge a water stream to a different watering area or target site than the other nozzles 104 of the rotary sprinkler 100. This allows the sprinkler 100 to produce concentric watering rings as the nozzle head 102 is rotated about the vertical axis 126. FIG. 2 is a simplified drawing illustrating exemplary water streams, each generally referred to as 130, from the rotary sprinkler 100 in accordance with embodiments of the invention. The watering streams 130 fall on watering areas, generally referred to as 132, located on the ground or other target.

In one embodiment, nozzle 104A is configured to discharge water stream 130A that falls on a watering area 132A that extends to a radial distance 134A for a given water pressure at the inlet 120 of the nozzle 104A. Nozzle 104B is configured to discharge a water stream 130B to a watering area 132B that extends to a radial distance 134A from the rotary sprinkler 100. Likewise, nozzle 104C is configured to discharge a water stream 130C that falls on a watering area 132C that extends to a radial distance 134C from the sprinkler 100. In one embodiment, the radial distance 134A is greater than the radial distance 132B, which is greater than the radial distance 132C.

In one embodiment, the watering areas 132A, 132B and 132C only partially overlap each other. For instance, the watering area 132A covered by the water stream 130A overlaps only a distal portion 136 of the watering area 132B. Similarly, the watering area 132B of the water stream 130B overlaps only a distal portion 138 of the watering area 132C of the water stream 130C. As a result, each of the water streams 130 produced by the plurality of nozzles 104 of the rotary sprinkler 100 are configured to water an annular ring around the sprinkler 100 as the nozzle head 102 is rotated about the vertical axis 108 relative to the base 106 that does not significantly overlap the annular watering areas covered by the other nozzles 104. In some embodiments, the center of each watering area 132 generally delivers a slightly higher concentration of water than as at the edges of the watering area 132. This is somewhat overcome by the overlap of the watering areas 132.

The resultant concentric watering rings allow for uniform watering per unit length in the radial direction from the sprinkler 100 as compared to single nozzle sprinklers. Another advantage is that when the system water flow or pressure is adjusted, a proportional change in the watering pattern occurs.

In one embodiment, the water streams 130 do not produce as much spray as single nozzle sprinklers of the prior art. In one embodiment, the watering areas 132 covered by each of the water streams 130 are approximately elliptical, as illustrated in FIG. 2. This has the advantage of reducing water loss through evaporation into the air, resulting in more efficient watering of the targeted area.

The radial distance the streams 130 discharged by the nozzles 104 travel from the sprinkler 100 depends on various nozzle parameters. These include the diameter of the outlet 124, the length of the fluid pathway 122 and the angle of the nozzle 104 relative to the horizontal plane (i.e., the ground). The resultant streams 130 also depend on the water pressure at the inlet 120.

In some embodiments, the nozzles 104 are oriented to discharge the streams 130 within a watering cone 137, having side edges separated by an angle 139. In some embodiments, the angle 139 is approximately of 2-3 degrees. This results in watering width of approximately 6 inches at 12 feet from the sprinkler 100. Such a narrow watering cone 137 allows for precise watering. The narrow watering areas 132 reduce watering variation within the watering areas 132 to improve watering uniformity across the all of the watering areas 132.

In one embodiment, each of the nozzles 104 has a central axis 140 that extends along the fluid pathway 122, as shown in FIG. 1. While the fluid pathway 122 is illustrated as a straight tubular section in FIG. 1, the fluid pathway 122 may also be curved, as described below. The central axis 140 generally extends through the center of the straight and/or curved sections of the fluid pathway 122 of each nozzle 104.

In one embodiment, the fluid pathway 122 has an interior diameter measured in a plane that is perpendicular to the central axis 140. In accordance with one embodiment, the fluid pathway 122 has a uniform interior diameter. In accordance with another embodiment, the fluid pathway 122 has a non-uniform interior diameter.

In one embodiment, each of the nozzles 104 has a different interior diameter, generally referred to as 142, at the outlet 124. In one embodiment, the nozzles 104 having watering areas 132 located farther from the sprinkler 100 have larger diameters than the nozzles 104 having watering areas 132 located more closely to the sprinkler 100. Thus, in one embodiment, the exemplary rotary sprinkler 100 illustrated in FIG. 1, nozzle 104A has an interior diameter 142A that is larger than the interior diameter 142B of the nozzle 104B. In accordance with another embodiment, the interior diameter 142B of the nozzle 104B is larger than the interior diameter 142C of the nozzle 104C.

In one embodiment, the interior diameters 142 of the nozzles 104 are set based on the expected water pressure at the water supply inlet 108 and the radial distance from the rotary sprinkler 100 where the desired watering area 132 is located. In one embodiment, the interior diameters of each of the nozzles 104 are set to produce streams 130 that produce watering areas 132 that form concentric rings around the rotary sprinkler 100 when the nozzle head 102 is rotated 360 degrees during a watering operation.

In one embodiment, the selection of the interior diameters 142 of the nozzles 104 is made based on an expected pressure at their inlets 120 and the desired maximum radial distance from the sprinkler 100 that is to be watered. For instance, using a pressure of 40 psi, a single nozzle radius of 0.125 inches can discharge a water stream a distance of 40 feet when the volumetric flow rate of the water at the inlet 120 is approximately 7 gallons per minute. In one embodiment, this overall radius is used to determine the outlet diameter settings for multiple nozzles such that concentric rings of watering areas may be produced.

In one embodiment, the outlet diameters 142 or radii of the plurality of the nozzles 104 are computed based on this single nozzle radius determination. In general, the single nozzle radius is divided into a plurality of nozzles 104 where the sum of the radii of the plurality nozzles 104 is equal to the single nozzle radius. The nozzles can then be used to discharge the water to distinct radial distances and form a set of concentric ring watering areas.

In one exemplary embodiment, for 100 psi of pressure and a water flow rate of approximately 36 gallons per minute at inlet 120, an overall radius of 0.25 is used to calculate multiple nozzles where the maximum desired distance is 80 feet.

Once the radius of the single nozzle is determined, such as that mentioned above, we can use that radius to determine the radii of proportionately smaller nozzles. In one embodiment, this is accomplished by selecting the nozzles 104 such that the sum of all their cross-sectional areas conforming to radii of k*r(n) is made to be equal to the area of the selected single nozzle, where k is a nozzle proportion factor. In accordance with one embodiment, k is within the range of 0.70-0.90 or 70-90%. In accordance with another embodiment, k is within the range of 0.70-0.80 or 70-80%. In accordance with another embodiment, k is within the range of 0.75-0.79 or 75-79%. In accordance with another embodiment, k is within the range of 0.77-0.78 or 77-78%. In one embodiment, k is 0.78.

As a result, in one embodiment, the interior diameter 142B of the nozzle 104B at its outlet 124 is determined by multiplying the interior diameter 142A at its outlet 124 by the proportion factor k. The interior diameter 142C of the nozzle 104C at its outlet 124 is then determined by multiplying the interior diameter 142B at the outlet 124 by the proportion factor k. For example, a single nozzle having a radius of 0.125 inches may be modeled as ten separate nozzles. For k=0.78, the largest nozzle will have a radius of approximately 0.77 inches and the smallest will have a radius of approximately 0.008 inches. Practical considerations like nozzle clogging may need to be considered for small nozzle sizes. As a result, a minimum radius, such as 0.0125 inches, may need to be set for some of the smaller nozzles.

In order to select an appropriate nozzle proportion factor k, the watering ring size for any given nozzle must be known. The watering ring size for a given nozzle is the radial distance between the proximal edge 144 and the distal edge 146 of the watering area 132 for a given pressure at the inlet 120, as shown in FIG. 2 for watering area 132A. This has been measured empirically and modeled as 117 times the radius in feet for one embodiment. For the 0.077 inch radius nozzle outlet 124, the watering ring size is 9 feet from the proximal edge 144 to the distal edge 146. For a maximum range of 40 feet, this means the 0.077 radius nozzle waters a ring from 31 to 40 feet under full pressure. Likewise, each successive nozzle can be set to water another ring inside the previous one. Taking 0.077 times 0.78 yields the next nozzle radius of approximately 0.06 inches. Taking 0.06 times 117 yields a ring size of 7 feet for the next ring. Thus, the second nozzle waters from 24 to 31 feet. Table 1 lists an exemplary set of 11 nozzles that may be used to generate concentric watering rings that cover a radial distance of 40 feet from the rotary nozzle 100 based on a water pressure of 40 psi.

TABLE 1

| Watering Ring Range (feet) | Nozzle Radius (inches) |
|---|---|
| 40-31 | 0.0770 |
| 31-24 | 0.0600 |
| 24-18.5 | 0.0468 |
| 18.5-14.2 | 0.0365 |
| 14.2-10.7 | 0.0298 |
| 10.7-8 | 0.0233 |
| 8-5.8 | 0.0185 |
| 5.8-4.1 | 0.0146 |
| 4.1-2.6 | 0.0125 |
| 2.6-1.3 | 0.0125 |
| 1.3-0 | 0.0125 |

As mentioned above, in one embodiment, the selection of the interior diameters 142 of the nozzles 104 is made based on an expected pressure at their inlets 120 and the desired maximum radial distance from the sprinkler 100 that is to be watered. In some embodiments, the outlet diameters 142 of the plurality of the nozzles 104 are computed based on this single nozzle radius determination. In general, the single nozzle radius is divided into a plurality of nozzles 104 where the sum of the radii of the plurality nozzles 104 is equal to the single nozzle radius. The nozzles can then be used to discharge the water to distinct radial distances and form a set of concentric ring watering areas.

The radii of multiple nozzles can be determined based on the selected single nozzle radius. In one embodiment, this is accomplished by setting the radii of the nozzles such that the sum of their corresponding areas is equal to the area of the selected single nozzle radius. In one embodiment, this is modeled as proportionately smaller nozzles having radii selected in accordance with Equation 1, where n is the nozzle number and k represents radius ratio between adjacent nozzles. In one embodiment, k has a range of 0.76-0.86.

$$r_{n+1} = k \cdot r_n \qquad \text{Eq. 1}$$

For each nozzle it has been found that the coverage distance or ring width that may be watered by the nozzle (watering ring size) is proportional to the nozzle radius in accordance with Equation 2, and the amount of water deposited in each ring is proportional to the area of the nozzle (a) in accordance with Equation 3, where D is the outer stream distance for the nozzle, such as 134B for nozzle 104B shown in FIG. 2, m is the model distance radius multiplier, and c is the coverage distance of the watering area 132. The optimal value for m depends on how the nozzle stream is spread before it hits the ground. In some embodiment, the value m is in a range of 90-120. In one embodiment, m is set to approximately 100 times the radius of the selected single nozzle in feet.

$$c(n) = m \cdot r_n \qquad \text{Eq. 2}$$

$$a = (D_n)^2 - (D_n - c_n)^2 / (r_n)^2 \qquad \text{Eq. 3}$$

Equations 2 and 3 can be combined as shown in Equation 4 to form the mathematical correlation between a, m and k provided in Equation 5.

$$k = r_{n+1}/r_n = (D_n - (2 \cdot m^2/(a+m^2)))/D_n = (a-m^2)/(a+m^2) \qquad \text{Eq. 4}$$

$$k = (a-m^2)/(a+m^2) \qquad \text{Eq. 5}$$

In one example, it was found that for that a selected single nozzle radius of 0.131 inches could deliver a water stream a distance of 38 feet when the water flow is at 40 psi and has a flow velocity of 5.5 feet per second in a 0.75 inch diameter pipe. Multiple nozzles can be calculated using the above equations to provide the overall radius of 0.131 inches and produce the desired set of concentric watering rings. For instance, 14 rings of proportionately smaller nozzles can be modeled using Equation 1 where n=1 to 14 where the sum of all the areas of the nozzles is made to be equal to that of a 0.131 inch nozzle and Equation 5 is used for determining values for k. In one embodiment k is 0.825, m is 91 and a is 86459 with the largest nozzle radius being 0.073 inches. Practical considerations like nozzle clogging may need to be considered to limit small nozzle sizes. In one embodiment the minimum hole size was limited to 0.0148 radius based on a filter screen opening of 0.022 inches. Table 2 lists the resultant exemplary set of 14 nozzles calculated as described above that may be used to generate concentric watering rings that cover a radial distance of 38 feet from the rotary nozzle 100.

TABLE 2

| Ring Range in Feet | Nozzle Radius |
|---|---|
| 38-31.36 | 0.0730 |
| 31.36-25.88 | 0.0602 |
| 25.88-21.35 | 0.0497 |
| 21.35-17.62 | 0.0410 |
| 17.6238-14.54 | 0.0339 |
| 14.54-12.00 | 0.0279 |
| 12.00-9.90 | 0.0230 |
| 9.90-8.17 | 0.0190 |
| 8.17-6.74 | 0.0157 |
| 6.74-5.39 | 0.0148 |
| 5.93-4.04 | 0.0148 |
| 4.04-2.70 | 0.0148 |
| 2.70-1.35 | 0.0148 |
| 1.35-0 | 0.01480 |

Below is an exemplary method for setting the radius of each of the nozzles 104. In order to complete the process of nozzle design one must tie the overall nozzle radius (single nozzle) to the other factors of the nozzle design as a whole. To start with the overall nozzle radius must be selected for a desired coverage distance and expected water pressure. In one embodiment an overall nozzle radius of 0.1314 inches sprayed 38-40 feet depending on the tube length, for a water pressure of 40 psi. If we pick 38 feet as a target distance then all of the nozzle coverages need to add up to 38 feet. In other words the sum of the $c = m \cdot r_n$ need to equal 38, based on Equation 2. In addition the sum of the areas of all of the nozzles should approximately equal the overall nozzle area. These calculations are shown below.

$$38 = m \cdot (r_1 + r_2 \ldots + r_n)$$

$$0.1314^2 = (r_1^2 + r_2^2 \ldots + r_n^2)$$

We already know the ratio between each adjacent radii can be computed using Equation 4, which is provided below.

$$r_{n+1}/r_n = (a-m^2)/(a+m^2)$$

In one example, m was empirically found to provide good watering coverage with a value of 91 using no taper on the nozzles using 14 total nozzles. Using a starting value of 0.073 for nozzle 1 a value for "a" can be computed using Equation 3.

$$a=(D_n^2-(D_n-(m*r_n))^2)/r_n^2=(38^2-(38-(91*0.073))^2)/0.073^2=86459.$$

Given values for a and m the nozzle ratio can be computed as follows:

$$r_{n+1}/r_n-(a-m^2)/(a+m^2)=(86459-91^2)/(86459+91^2)=0.825.$$

We solve for $r_n$ as follows:

$$r_n=r_{n+1}*0.825=0.073*0.825=0.060 \text{(for nozzle 2)}$$

Table 3 lists the resultant nozzles based on the method described above. As the holes get smaller a practical limit is reached and the ratio is limited to one. As you can see the smallest nozzle radius was limited to 0.01468 inches in radius in the table below. While this was a limitation for this design based on expected nozzle contamination other applications will require alternate considerations. Because the selection of a value for $r_n$ is based on a desired overall nozzle radius, the number of nozzles and a limit to how small the holes can be, trial and error was needed to find an exact set of numbers.

TABLE 3

| Nozzle Range (feet) | Nozzle Radius (inches) | Nozzle Ratio ($r_n/r_{n-1}$) | Nozzle Coverage (feet) |
|---|---|---|---|
| 38-31.36 | 0.07300 | 0.8252 | 6.643 |
| 31.36-25.88 | 0.06024 | 0.8252 | 5.482 |
| 25.88-21.35 | 0.04971 | 0.8252 | 4.523 |
| 21.35-17.64 | 0.04102 | 0.8252 | 3.733 |
| 17.64-14.54 | 0.03385 | 0.8252 | 3.080 |
| 14.54-12.00 | 0.02793 | 0.8252 | 2.542 |
| 12.00-9.90 | 0.02305 | 0.8252 | 2.097 |
| 9.90-8.17 | 0.01902 | 0.8252 | 1.731 |
| 8.17-6.74 | 0.01569 | 0.9441 | 1.428 |
| 6.74-5.39 | 0.01482 | 1 | 1.348 |
| 5.39-4.04 | 0.01482 | 1 | 1.348 |
| 4.04-2.70 | 0.01482 | 1 | 1.348 |
| 2.70-1.35 | 0.01482 | 1 | 1.348 |
| 1.35-0.00 | 0.01482 | 1 | 1.348 |

In one embodiment, after the appropriate nozzles have been selected, trajectory angles for each nozzle can be computed based on expected water velocity, nozzle height above the ground and the desired radial distance of the watering area to be covered by the nozzle. In one embodiment, the trajectory angle 150 for each nozzle is determined by the orientation of the central axis 140 relative to a horizontal plane 148 extending perpendicularly to the vertical axis 126, about which the nozzle head 102 is configured to rotate.

In one embodiment, each of the nozzles of the rotary sprinkler 100 has a different trajectory angle, generally referred to as 150. In one embodiment, the trajectory angle 150 of the nozzle 104 that is configured to have the farthest reaching output stream 130 (e.g., nozzle 104A) has the largest trajectory angle 150. In one embodiment, this trajectory angle 150 is approximately 30-45 degrees. In one embodiment, nozzles 104 responsible for directing water streams 130 to shorter radial distances from the rotary sprinkler 100 have lower trajectory angles 150 than nozzles 104 that are responsible for generating water streams 130 that travel larger radial distances from the sprinkler 100. Accordingly, in one embodiment, nozzle 104A has a trajectory angle 150A, nozzle 104B has a trajectory angle 150B and nozzle 104C has a trajectory angle 150C, as shown in FIG. 1.

The length of each of the nozzles 104 determines the stream 130 that is discharged by the nozzle. If the nozzle 104 is too short, the stream breaks up upon exit of the nozzle 104 thereby limiting the distance the stream can travel. If the nozzle 104 is too long, the pressure drop across the nozzle 104 slows the velocity of the water flow through the nozzle, which can also prevent the stream 130 from reaching a desired radial distance from the rotary sprinkler 100. In one embodiment, the nozzles 104 are each configured to have water flows through the nozzles 104 that travel at approximately the same velocity for a given pressure, but to different radial distances from the nozzle head 102. This allows the sprinkler 100 to provide a substantially even watering pattern over the entire radial distance covered by the water streams 130. In some embodiments, the nozzles 104 are each configured such that the variance in the velocity of the water through the nozzles 104 is less than 2% over a pressure range of approximately 23-60 psi. However, it is understood that the velocity of the water through some of the nozzles 104 configured to discharge water streams 130 the shortest distances 134 from the sprinkler 100 may have a greater variance from the longer range nozzles 104, in some embodiments.

In one embodiment, the length of each nozzle 104, generally referred to as 154, corresponds to the length of the central axis 140 measured from the inlet 120 to the outlet 124, as shown in FIG. 1. In one embodiment, the lengths 154 of the nozzles 104 are approximated using Darcy's formula provided below, where Δp is the pressure drop across the nozzle 104 due to friction in the fluid pathway 122, ρ is the density of water, f is a friction coefficient, L is the pipe length 154, v is the water flow rate, D is the internal pipe diameter, and Q is the volumetric flow rate of the water.

$$\Delta p = \frac{\rho * f * L * v^2}{2D} = \frac{8\rho * f * L * Q^2}{\pi^2 D^5}$$

For desired pressure drop across the nozzle 104 based on the static versus dynamic pressure of the system, a length of the fluid pathway 122 for a particular nozzle 104 is computed for a specific output velocity (e.g., approximately 39 feet per second). In this situation the largest nozzle is the longest and the most likely to produce an irregular flow if it is too short. The length 154 of the fluid pathway 122 of the nozzle needs 104 to be long enough so that the flow reaches a turbulent state. If the length 154 is less than this critical length, the flow through the nozzle 104 will be irregular. Lengths 154 that are greater than this critical length, reduces the velocity of the water that is ejected from the nozzle 104. For instance, a nozzle radius of 0.077 inches requires a length 154 of approximately 2.26 inches in order to work in a system providing 40 psi of dynamic pressure. Shorter lengths 154 will not produce the desired 40 foot radial distance due to irregular flow in the nozzle 104, and longer lengths 154 will reduce the radial distance the stream 130 can travel due to velocity reduction in the fluid pathway 122. Longer lengths 154 also reduce the size of the watering area 132. Once the exit velocity for the largest nozzle 104 has been computed, the lengths 154 of the remaining nozzles 104 can be computed given the same pressure drop (e.g., 12.5 psi) and velocity. In this way, all nozzle streams 130 exit at a similar velocity and the trajectory angle 150 can be used to determine the radial distance the stream 130 travels from the rotary sprinkler 100.

Due to the turbulent flow in the fluid pathway 122, each of the streams 130 break up into droplets as the stream travels from the outlet 124 to the targeted watering area 132. This creates a spray pattern on the ground that forms the watering area 132. The watering pattern 132 varies in proportion to the water flow that travels through the nozzle 104. This allows for the formation of shorter and longer sets of concentric watering rings.

In one embodiment, the stream 130 discharged from the nozzle 104 responsible for the watering area 132 located closest to the sprinkler 100 is diffused by a modification to the outlet 124, which may include a curved member in the fluid flow path leading up to the outlet 124 resulting in a taller outlet and a reduction in the outlet width resulting in watering area 132 having a longer and more narrow spray pattern compared to the nozzles 104 that lack the modification. Alternatively, a nozzle 104 may be configured to generate a spray pattern to cover the ground adjacent the sprinkler 100.

In one embodiment, the rotary sprinkler 100 includes a valve 160 that controls the flow of water through the fluid flow paths 114 and 116 of the sprinkler 100, as shown in FIG. 1. In one embodiment, the valve 160 has a closed position, in which water is prevented from flowing along the fluid flow paths, and an opened position, in which water is free to travel along the fluid flow paths. In one embodiment, the valve 160 also includes intermediary positions that allow the flow rate of the water through the fluid flow path to be set to a value that is less than the maximum flow rate achieved when the valve 160 is in the fully opened position. As a result, the valve 160 may be used to adjust the flow rate of the water through the fluid flow path 112 to be set to the desired level. This allows for greater control over the streams 130 produced by the nozzles 104 and their watering areas 132.

In one embodiment, the position of the valve 160 is controlled by an electric motor 162. The motor 162 may be a stepper motor, a motor with an encoder, a servo motor, or other suitable electric motor or device that may be used to adjust the position of the valve 160.

Figure 3:
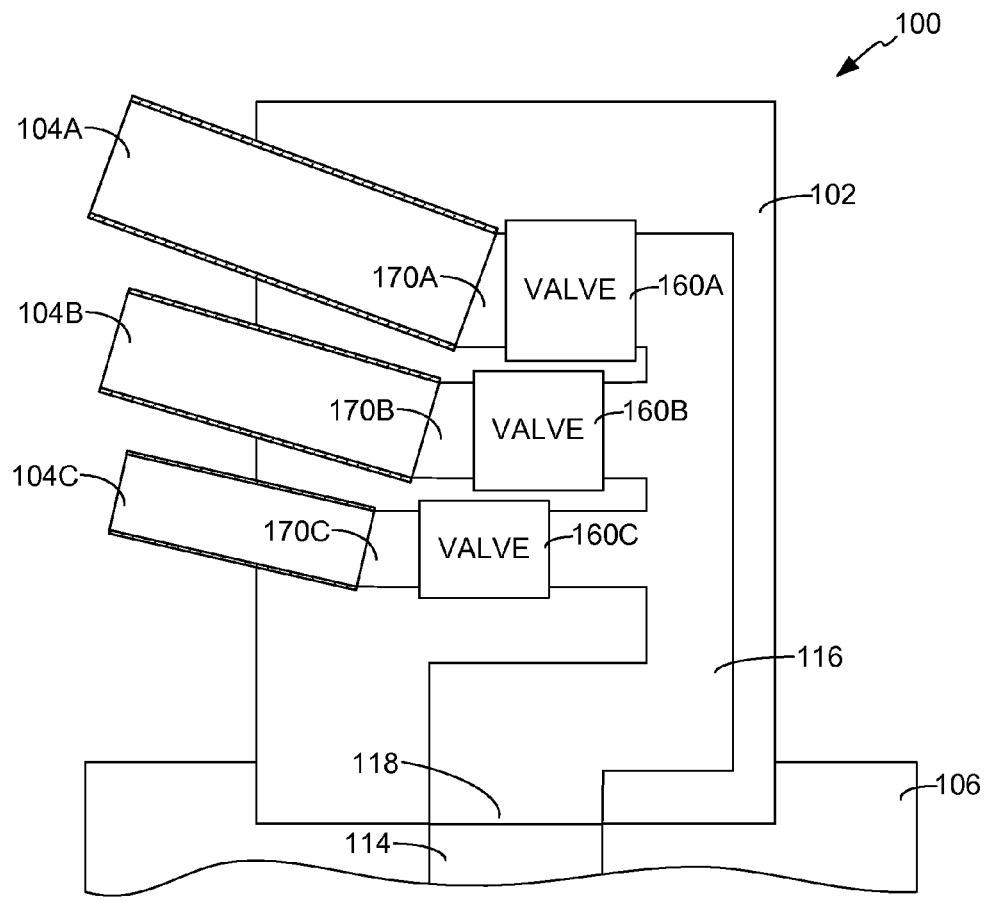
FIG. 3 is a schematic diagram of a nozzle head portion of a rotary sprinkler in accordance with embodiments of the invention.

In one embodiment, the rotary sprinkler 100 includes a plurality of valves 160, as schematically illustrated in FIG. 3. In one embodiment, the plurality of valves 160 are components of a multiplexor valve, rather than separate valves. Also, the valves 160 may also be located in the base 106 rather than the nozzle head 102. Each of the valves 160 may be actuated between opened and closed positions using one or more motors, which are not shown in order to simplify the illustration, responsive to control signals as discussed above. In one embodiment, each of the valves 160 in the sprinkler 100, control a flow of water to one or more of the nozzles 104 of the nozzle head 102. For example, valve 160A can be used to control the flow of water through a fluid flow path 170A connecting the water inlet 108 to the inlet 120 of the nozzle 104A, valve 160B can be used to control the flow of water through the fluid flow path 170B connecting the water inlet 108 to the inlet 120 of the nozzle 104B, and valve 160C can be used to control the flow of water through the fluid flow path 170C connecting the water inlet 108 to the inlet 120 of the nozzle 104C.

The flow of water to each of the nozzles 104 of the sprinkler 100 may be controlled independently of the flow of water to the other nozzles in the rotary sprinkler 100 through the actuation of the valves 160. As a result, individual nozzles may be turned on or off, or the flow rates through the nozzles 104 may be adjusted to a desired level to produce the desired watering areas 132. For instance, while the rotary sprinkler 100 may have the capability of watering out to a 40 foot radial distance from the sprinkler 100, it may be desirable to only water 25 feet from the sprinkler 100. In that case, the one or more nozzles 104 responsible for covering the radial distance from 25 to 40 feet from the sprinkler 100 may be turned off by setting the corresponding valves 160 to the closed position. The flow of water to the remaining nozzles 104 may be reduced, if necessary, by setting the corresponding valves 160 accordingly.

In accordance with another embodiment, the rotary sprinkler 100 includes a sensor 172 that measures a parameter of the water in the fluid flow pathway 114 or 116. In one embodiment, the sensor comprises a pressure sensor that measures a pressure of the fluid in the fluid flow pathway 114 (shown) or 116. In accordance with another embodiment, the sensor 172 is a flow sensor that measures a flow rate of the water traveling through the fluid flow path 114 (shown) or 116. In one embodiment, the sensor 172 produces an output signal 174 that is representative of the parameter measured by the sensor 172.

In one embodiment, the sprinkler 100 includes a controller 164. In one embodiment, the controller 164 represents one or more processors and circuitry used to perform functions described herein. In one embodiment, the processor of the controller 164 is configured to execute sprinkler or watering program instructions stored in memory 166 (e.g., RAM, ROM, flash memory, or other tangible data storage medium) and perform method steps described herein responsive to the execution of the program instructions. Embodiments of the program instructions include the date and time to commence a watering operation, the duration of a watering operation, valve settings, and other information.

In one embodiment, the program instructions comprise valve settings and the controller 164 controls the one or more valves 160 in response to the valve settings. In one embodiment, the valve settings for each of the one or more valves 160 map a desired water flow rate through the valve 160 to a specific valve position. In one embodiment, this flow rate mapping is provided for a series of pressures. For example, when the inlet pressure is 40 psi and the desired input flow rate is 9 feet per second, the mapping will identify a valve position, which is included in the program instructions stored in the memory 166. The valve settings may be dynamically set by the controller 164 based on the output signal 174 (flow rate or pressure) and a predefined desired water flow rate through the valve 160. Accordingly, the controller 164 may adjust the flow of the water through the sprinkler 100 responsive to the execution of program instructions stored in the memory 166.

In one embodiment, the sprinkler program instructions include valve setting instructions that are dependent upon the angular position of the nozzles 104 about the axis 126 relative to a reference. This allows for the generation of non-circular watering patterns by modifying the distance the discharged streams 130 travel from the sprinkler 100. As a result, the sprinkler 100 can produce watering patterns that avoid targets that are within the range of the sprinkler 100 that should not be watered.

In one embodiment, the sprinkler program instructions include rotation speed settings that set the rotational speed of the nozzle head 102. Execution of the program instructions by the controller 164 generate control signals to the motor 129 based on the rotation speed settings that are used to control the motor 129. In one embodiment, the rotation speed settings define a constant rotational velocity for the nozzle head 102. In accordance with another embodiment, the rotation speed settings are dependent upon the angular position of the nozzle head 102 about the axis 126 relative to a reference. Thus, in one embodiment, the executed program instructions generate control signals to the motor 129 that cause the rotational speed of the nozzle head 102 to vary depending on its angular position. This allows for control of the amount of water that is delivered to certain angular sections of the watering pattern generated by the sprinkler. For instance, while the nozzles deliver a continuous amount of water to their respective watering areas 132, the nozzle head 102 may be rotated slower to deliver more water to an angular section of the watering pattern, or faster to deliver less water to an angular section of the watering pattern. This angular speed control of the nozzle head 102 may also be combined with the control of the positions of the one or more valves in each sprinkler 100 to control the amount of water that is delivered by the sprinkler 100.

In one embodiment, the method steps comprise driving the rotation of the nozzle head 102 through the control of the motor 129 responsive to program instructions stored in the memory 166.

In one embodiment, the method steps comprise receiving the output signal 174 from the sensor. In one embodiment, the method steps comprise processing the output signal 174 from the sensor to produce a value indicative of the measured parameter. In one embodiment, the method steps comprise communicating the output signal 174 or the corresponding value to a remote system, such as a system controller.

In one embodiment, the controller 164 is configured to receive control signals from a system controller located remotely from the sprinkler 100, and process the control signals to perform method steps described herein, such as setting the positions of the one or more valves 160, rotating the nozzle head 102, communicating information, acknowledging communications, and other method steps. In one embodiment, the controller 164 relays the output signal 174 or a value represented by the output signal 174 to the system controller using either a wired or wireless communication link.

In one embodiment, the sprinkler 100 includes a power supply 175, such as a battery, a capacitor, a solar cell or other source of electrical energy, that provides power to the processor of the controller 164, the motor 129, the motor 162, the sensor 172 and/or other component of the sprinkler 100 requiring electrical energy. In one embodiment, the power supply 175 is a rechargeable power supply, which may be recharged by signals received over a control line 177 or other wired connection, such as from the system controller described below.

In accordance with another embodiment, the rotary sprinkler 100 includes a pressure regulator 176 that is configured to regulate a pressure of the water in the fluid flow paths 114 and/or 116. In one embodiment, the pressure regulator 176 is configured to maintain a pressure of the water in at least the fluid flow path 116 below a maximum pressure, such as 40 psi.

Figure 4:
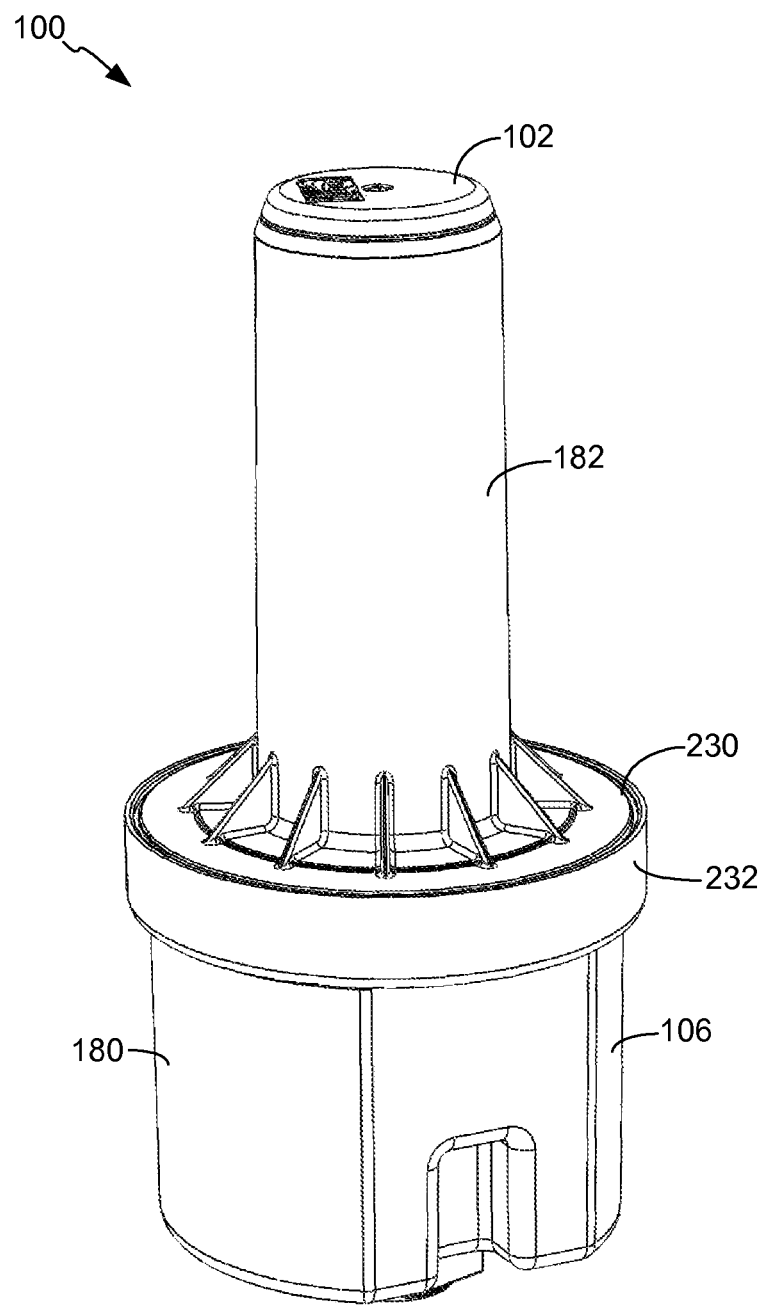
FIGS. 4 and 5 are perspective views of the rotary sprinkler formed in accordance with embodiments of the invention with a nozzle head in lowered and raised positions, respectively.
Figure 5:
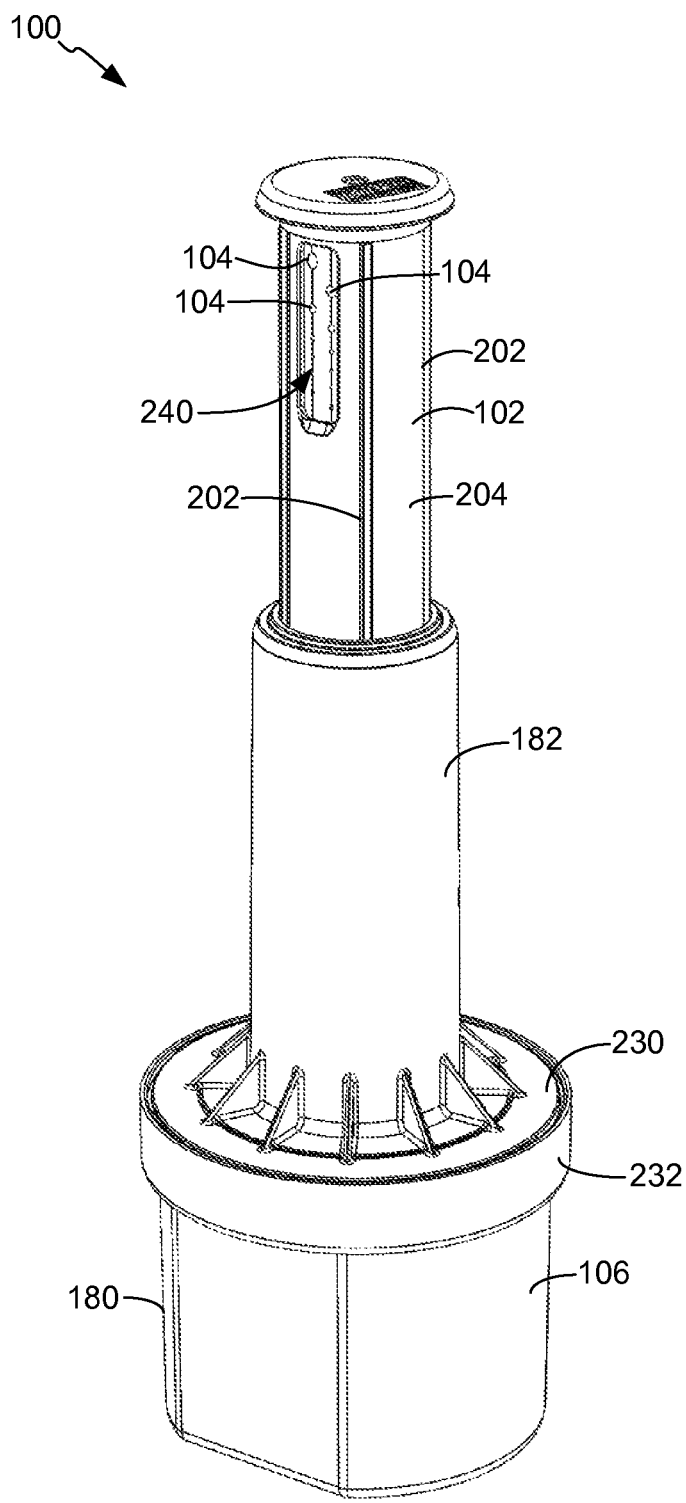

A specific example of an in-ground version of the rotary sprinkler 100 will be described with reference to FIGS. 4-9. FIGS. 4 and 5 are perspective views of the rotary sprinkler 100 depicting the nozzle head 102 in lowered and raised positions, respectively. In one embodiment, the base 106 comprises a lower container 180 and a pedestal 182 that extends above the container 180. The nozzle head 102 is received within the pedestal 182 when in the lowered position (FIG. 4) and extends to the raised position (FIG. 5) in response to water pressure applied to the inlet 118 of the nozzle head 102.

Figure 6:
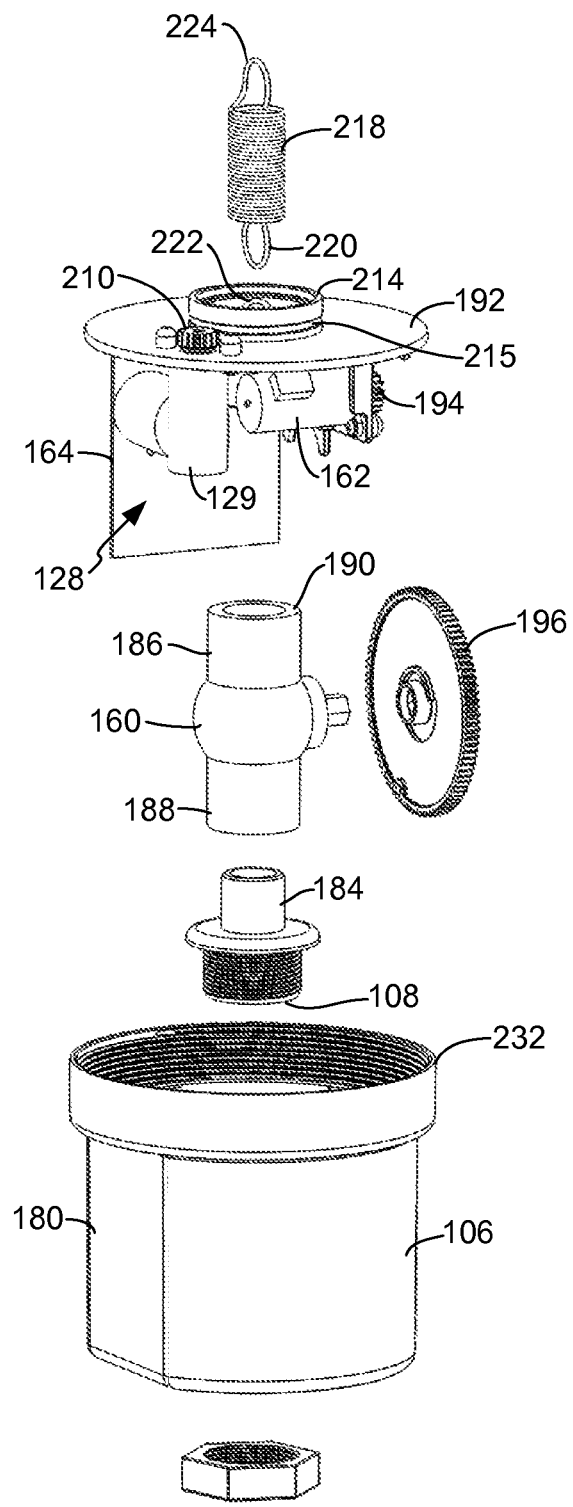
FIGS. 6 and 7 are exploded perspective views of components contained within a sprinkler base in accordance with embodiments of the invention.
Figure 7:
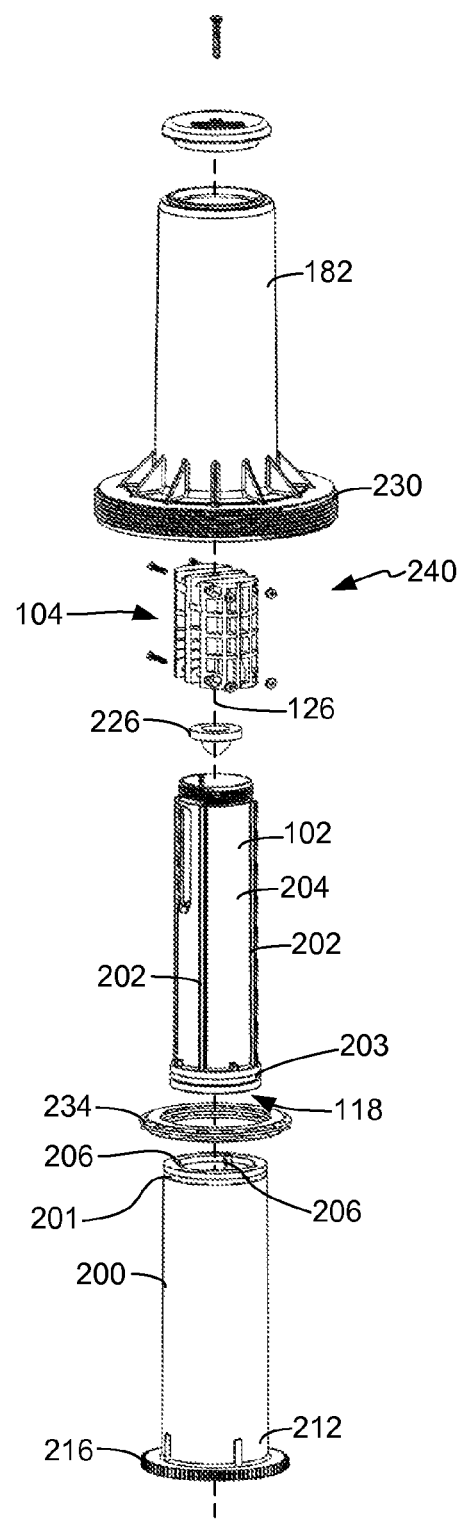

FIG. 6 is an exploded perspective view of the components contained within the container 180 of the base 106. FIG. 7 is an exploded perspective view of the components contained or supported by the pedestal 182. The fluid flow path 114 extends through a pipe fitting 184 that may be coupled to a water supply line 110 (FIG. 1) and defines the water inlet 108. The fluid flow path 114 also extends through a tubing section 186 having a proximal end 188 that attaches to the pipe fitting 184 and a distal end 190 that extends through a cover 192.

In one embodiment, the tubing section 186 includes a valve 160 that is adapted to control the flow of water through the tubing section 186. In one embodiment, a motor 162 drives the valve 160 between the closed, intermediary and fully opened positions through gears 194 and 196.

In one embodiment, the nozzle head 102 is received within a rotatable support 200, which in turn is received within the pedestal 182. The nozzle head 102 is allowed to telescope out of the rotatable support 200 from the lowered position (FIG. 4) to the raised position (FIG. 5) in response to the application of water pressure at the inlet 118 of the nozzle head 102. In some embodiments, an O-ring or other suitable sealing member, is secured within a channel 201 located at the top of the rotatable support 200 to form a seal between the exterior wall of the rotatable support 200 and an interior wall of the pedestal 182, as shown in FIG. 7. Additionally, an O-ring or other suitable sealing member, is secured within a channel 203 located at the base of the nozzle head 102 to form a seal between the nozzle head 102 and an interior wall of the rotatable support 200, as shown in FIG. 7.

In some embodiments, the nozzle head 102 includes protrusions 202 that extend from the exterior surface 204 and are generally aligned with the vertical axis 126. The protrusions 202 are received within vertical slots 206 formed in the interior wall of the rotatable support 200. The engagement of the protrusions 202 of the nozzle head 102 with the slots 206 of the rotatable support 200 causes the nozzle head 102 to rotate along with rotation of the rotatable support 200 about the vertical axis 126.

In one embodiment, the sprinkler 100 comprises a drive mechanism 128 that is contained within the container 180. In one embodiment, the drive mechanism 128 comprises a motor 129 that drives rotation of a gear 210 that is supported by the cover 192. A bottom end 212 of the rotatable support 200 receives a cylindrical protrusion 214 and includes a gear 216. In some embodiments, an O-ring or other suitable sealing member, is secured in a channel 215 of the protrusion 214 to form a seal between the exterior of the protrusion 214 and an interior wall of bottom end 212 of the rotatable support 200. The motor 129 of the drive mechanism 128 rotates the rotatable support 200 about the axis 126 using the gears 210 and 216, which in turn drives the rotation of the nozzle head 102 relative to the pedestal 182 and the container 180 of the base 106.

A spring 218 has a proximal end 220 that is attached to a hook 222 on the cover 192 and a distal end 224 that is attached to a structure supported within the nozzle head 102. The spring 218 maintains the nozzle head 102 in the lowered position when there is insufficient water pressure at the inlet 118, and allows the nozzle head 102 to extend to the raised position under sufficient water pressure at the inlet 118.

In one embodiment, a filter screen 226, shown in FIG. 7, is located within the flow path 116 of the nozzle head 102. Alternatively, the filter screen may be located in the flow path 114 of the base 106.

In one embodiment, the rotary sprinkler 100 includes a controller 164 that is contained within the container 180. In one embodiment, the controller 164 operates to control the motor 162 and the positions of the valve 160. In one embodiment, the sprinkler 100 includes a sensor that detects the positions of the valve 160. One exemplary sensor that can be used to carry out this function is a Hall Effect sensor that detects a magnetic field of a magnet that is attached to the gear 196, for example.

In one embodiment, the controller 164 controls the motor 129 of the drive mechanism 128 and the rotation of the nozzle head 102. In one embodiment, the sprinkler 100 includes a sensor that detects the angular position of the nozzle head relative to the base 106. One exemplary sensor capable of performing this function is a Hall Effect sensor that can detect the magnetic field of a magnet that is attached to the rotatable support 200, the nozzle head 102, or the gear 216 to detect the angular position of the nozzle head 102 relative to the base 106, for example.

In one embodiment, the controller 164 is configured to receive and process control signals from a system controller located remotely from the sprinkler 100. The control signals received from the system controller may be provided either through a wired connection or wirelessly in accordance with conventional techniques. The controller 164 may perform method steps responsive to the control signals, as discussed above.

In one embodiment, the container 180 includes a sealed compartment, in which the electronics of the sprinkler 100 are housed. In one embodiment, the pedestal 182 includes a threaded base 230 which may be screwed on to a threaded opening 232 of the container 180. A seal 234 is positioned between the threaded base 230 and the container 180 to prevent water from entering the compartment containing the electronics.

Figure 8:
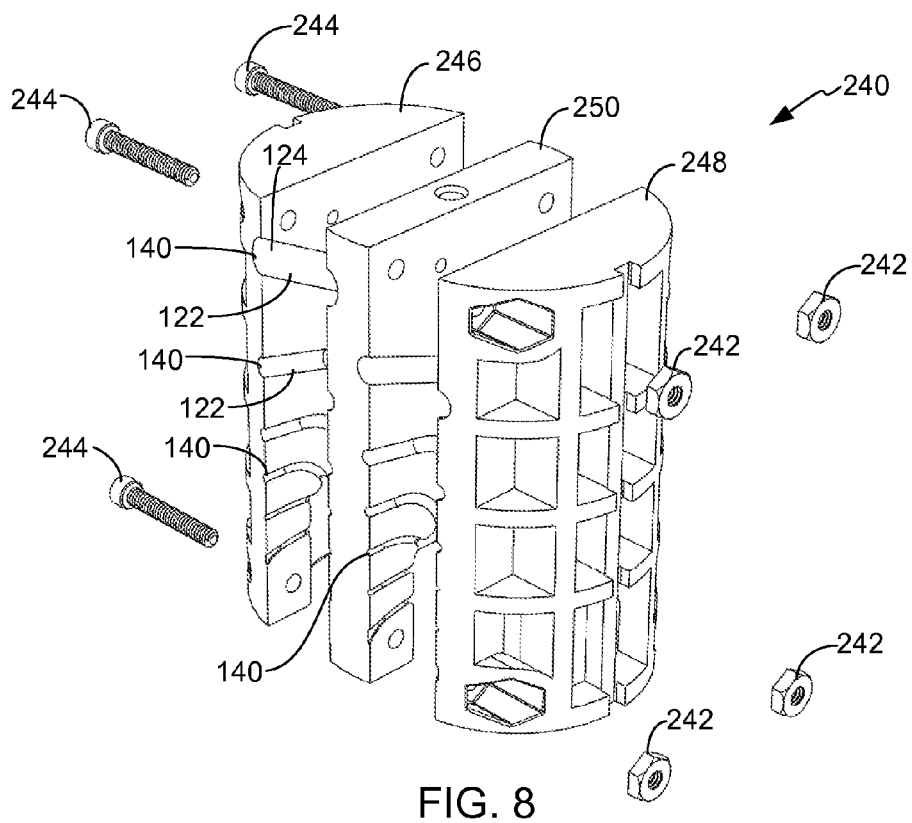
FIG. 8 is an exploded perspective view of the nozzle assembly in accordance with embodiments of the invention.

The plurality of nozzles 104 are supported by the nozzle head 102. In one embodiment, the nozzles 104 are formed in a nozzle assembly 240. The nozzle assembly 240 is secured to the nozzle head 102 such that the nozzle assembly 240 rotates with rotation of the nozzle head 102. FIG. 8 is an exploded perspective view of the nozzle assembly 240 in accordance with embodiments of the invention. The nozzle assembly 240 may comprise two or more components depending on the number of nozzles 104. Thus, while the illustrated embodiment of the nozzle assembly 240 includes three components that align to form twelve nozzles 104, the nozzle assembly 240 may include two halves that form two or more nozzles 104. In one embodiment, the components forming the nozzle assembly 240 are secured together using nuts 242 and bolts 244. Alternatively, the components forming the nozzle assembly 240 may be connected using an adhesive, by welding the components together, or other suitable technique. Further, the nozzle assembly 240 may also be molded as a single unitary component.

In one embodiment, the nozzle assemble 240 comprises end components 246 and 248 and a central component 250. Each end component 246 and 248 includes one half of the fluid pathways 122 of each of the nozzles 104. The other half of the fluid pathways 122 of the nozzles 104 are formed by the central component 250. When the components 246, 248 and 250 are assembled, each half of the fluid pathway 122 of each nozzle 104 is aligned with its corresponding half fluid pathway 122 to form the full nozzle 104.

Figure 9:
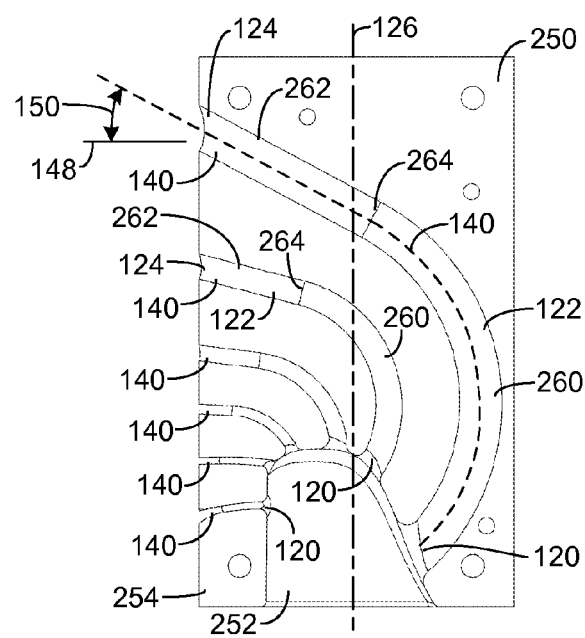
FIG. 9 is a side cross-sectional view of a set of the nozzles formed in accordance with embodiments of the invention.

FIG. 9 is a side view of the central component 250 of the nozzle assembly 240 and, therefore, a cross-sectional view of one set of the nozzles 104. As shown in FIG. 9, the inlets 120 of each of the nozzles 104 open to a cavity 252 at the base 254 of the nozzle assembly 240. Water received at the inlet 118 of the nozzle head 102 travels through the nozzle head 102 to the cavity 252 where it is provided to inlets 120 of the nozzles 104.

In one embodiment, one or more of the nozzles 104 includes a curved section 260 and a straight section 262. In one embodiment, the curved section 260 extends from the inlet 120 to a location 264 between the inlet 120 and the outlet 124. The straight section 262 extends from the location 264 to the outlet 124.

Figure 10:
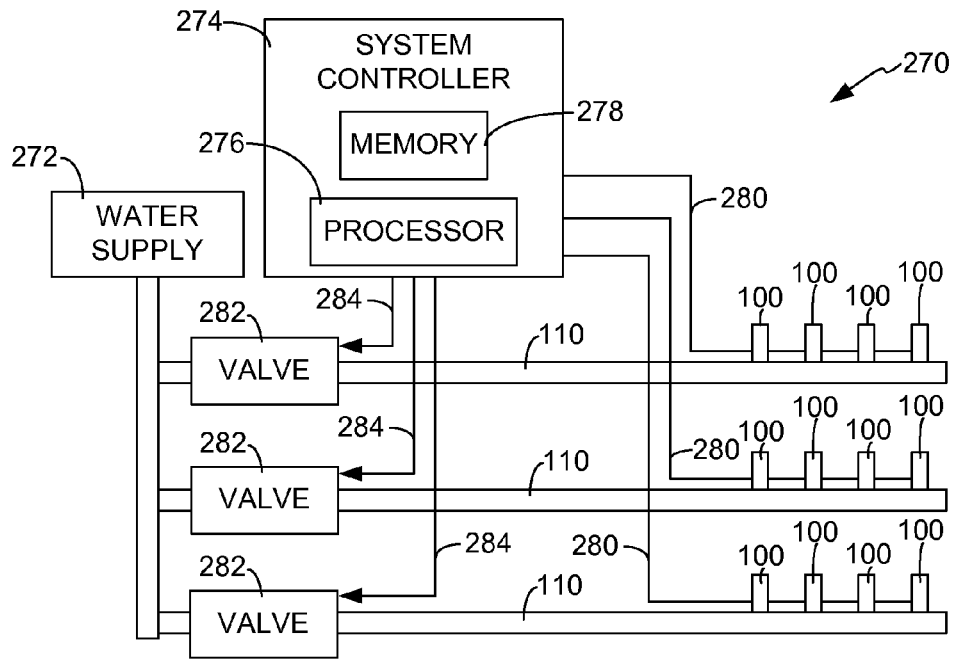
FIG. 10 is a simplified diagram of a sprinkler system in accordance with embodiments of the invention.

FIG. 10 is a simplified diagram of a sprinkler system 270 in accordance with embodiments of the invention. The sprinkler system 270 generally includes a plurality of the rotary sprinklers 100 formed in accordance with embodiments of the invention. Each of the sprinklers 100 are coupled to a pressurized water supply 272, such as a household water supply, a pumped water supply, or other convention water supply. In one embodiment, the system comprises a system controller 274 comprising at least one processor 276 and memory 278 (e.g., RAM, ROM, flash memory, or other tangible data storage medium). In one embodiment, the memory 278 contains program instructions that are executable by the processor to perform method steps described herein.

In one embodiment, the system controller 274 communicates with each of the sprinklers 100 over one or more wired or wireless communication links represented by lines 280 formed in accordance with standard communication protocols. In one embodiment, the control signals provided over the communication links 280 are generated responsive to the execution of the program instructions in the memory 278 by the processor 276. In one embodiment, the control signals are communicated over the communication links 280 to controllers 164 of the rotary sprinklers 100. The controllers 164 are configured to operate the sprinklers 100 (e.g., set valve positions, rotate the nozzle head, etc.), communicate information (e.g., sensor information) back to the system controller 274, or perform other function responsive to the control signals. Alternatively, when the rotary sprinklers 100 do not include a controller 164, the control signals may be communicated over the communication links 280 directly to the relevant components of the sprinklers 100, such as the motor 162 or the motor 129, for example. Also, the outputs 174 from the sensors 172 of the rotary sprinklers 100 may also be communicated over the communication links 280 to the system controller 274.

In one embodiment, the control signals comprise valve settings for setting the positions of the one or more valves 160 in each of the controllers 100. When the sprinklers 100 include the one or more valves 160, it is not necessary to include separate valves 282 for each of the water lines 110 feeding different groups of the rotary sprinklers 100. Rather, the system controller 274 may individually activate any one of the rotary sprinklers 100 through the control signals. Thus, the system controller 274 is capable of activating and deactivating individual rotary sprinklers 100 based on the execution of the watering program instructions stored in memory 278.

In one embodiment, the system 270 includes one or more valves 282 that operate to control the flow of water along one or more of the water lines 110. In accordance with this embodiment, the system controller 274 is configured to control the positioning of the valves 282 using an appropriate control signal over a communication link 284 in accordance with conventional techniques. In accordance with this embodiment, it may not be necessary for each of the rotary sprinklers 100 to include their own internal valves 160. However, the inclusion of the valves 160 in the rotary sprinklers 100 allow the system controller 274 to activate individual sprinklers 100 within each group of sprinklers 100 fed by the corresponding valve 282.

In one embodiment, the memory 278 comprises a series of valve settings for each of the valves 160 of the sprinklers 100 that map a desired water flow rate through the valve 160 to a valve position, as described above. The valve settings may be dynamically set by the controller 274 based on the output signal 174 (flow rate or pressure) from the sensor 172 (or a sensor in the water line 110) and a predefined desired water flow rate through the valve 160. Alternatively, when the pressure in the system is regulated, such as by pressure regulator 176, the valve settings may be fixed in the watering program stored in the memory 278.

Figure 11:
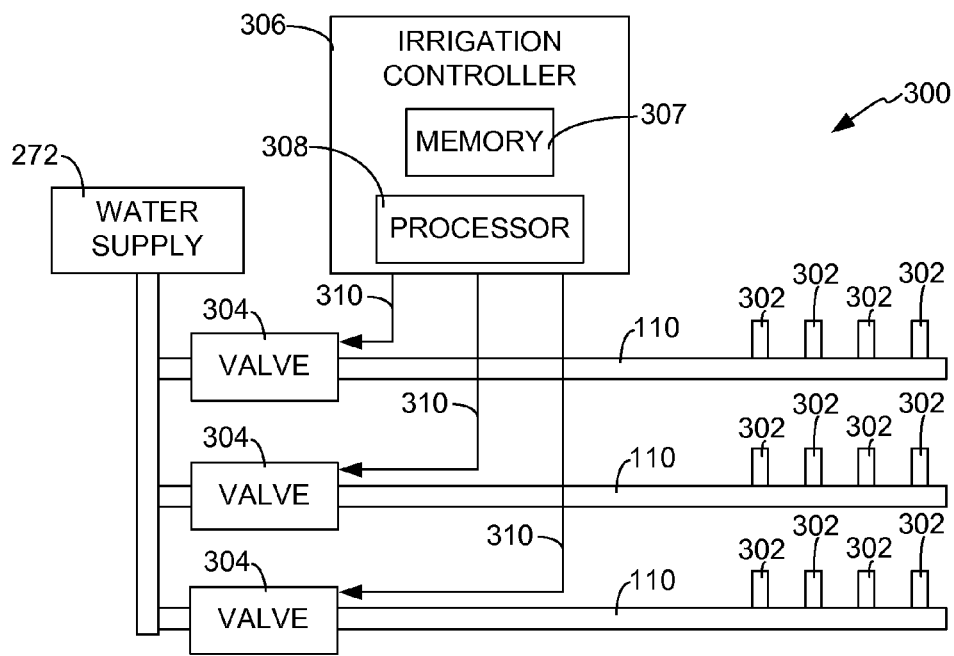
FIG. 11 is a simplified diagram of a watering system in accordance with systems of the prior art.

FIG. 11 is a simplified diagram of a watering system 300 in accordance with systems of the prior art. As with system 270, the watering system 300 includes a water supply 272 that is fluidically coupled to multiple sprinklers 302 through a water line 110. The sprinklers 302 are typically passive sprinklers, groups of which are activated in response to the opening of a valve 304 in the water line corresponding to the group.

The system 300 also includes an irrigation controller 306. Embodiments of the controller 306 include memory 307 (e.g., ROM, RAM, flash, or other tangible data storage medium) and at least one processor 308. The memory 307 contains zone program instructions that are executable by the processor 308 to control the valves 304 and perform a desired watering operation. For example, the irrigation controller 306 generates zone valve signals 309 based on the zone program instructions that open one of the valves 304 of the system 300 responsive to the program instructions using the signals 309. The opened valve 304 feeds water to the corresponding group of sprinklers 302 and a watering operation by the group of sprinklers 302 commences. After a predetermined period of time, the controller 306 closes the valve 304 and opens another valve 304 using the signals 309 to feed water to another group of the sprinklers 302 and commence another watering operation. This is repeated until all the groups of sprinklers 302 perform their watering operation in accordance with the program instructions.

Figure 12:
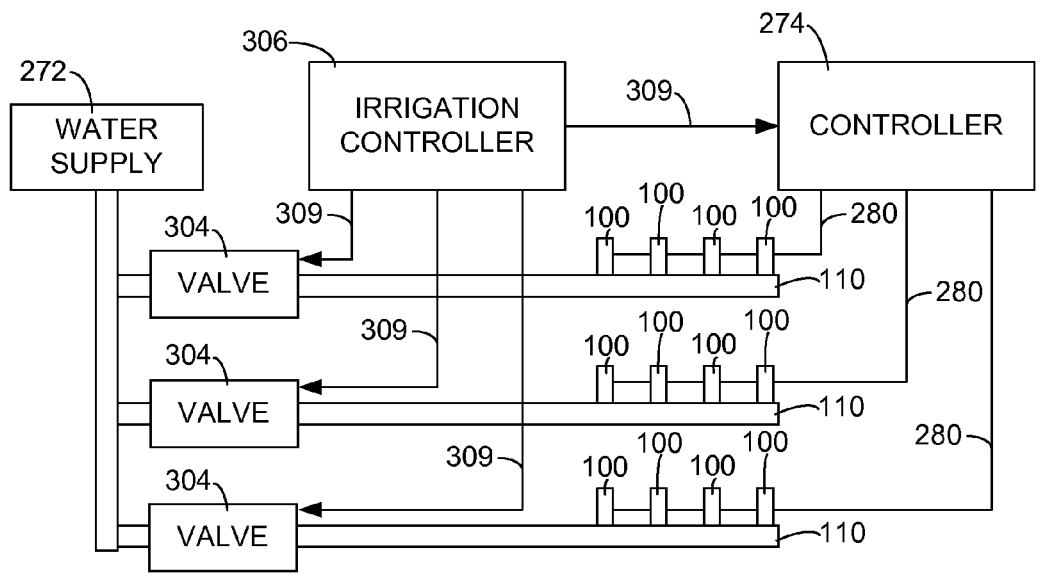
FIG. 12 is a simplified diagram illustrating an update to the system depicted in FIG. 11.

One embodiment of the invention relates to updating prior art sprinkler systems, such as system 300, to include the rotary sprinklers 100 formed in accordance with one or more embodiments described herein. FIG. 12 is a simplified diagram illustrating such an update to the system 300 depicted in FIG. 11. In one embodiment, the sprinklers 302 are replaced with sprinklers 100 formed in accordance with embodiments of the invention. Depending on the needs of the system, it may not be necessary to replace each of the sprinklers 302 with one of the sprinklers 100. Rather, it may be possible to use fewer of the sprinklers 100 than were previously required to perform the desired watering operations.

The system controller 274 is also added. If necessary, wired communication links 280 between the system controller 274 and the rotary sprinklers 100 are installed. Wireless communication links may also be used.

In one embodiment, the system controller 274 is configured to detect the activation of the valves 304 and activate the corresponding sprinklers 100 that are fed by the open valve 304. This detection may occur by intercepting or receiving the signal 309 transmitted by the irrigation controller 306 to the valve 304. Alternatively, the system controller 274 may detect the rise in pressure in the water line 110 using the sensor 172 within one or more of the sprinklers 100, or a pressure sensor that is installed in the line 110. Upon detection of the opening of the valve 304, the system controller 274 activates the corresponding sprinklers 100 and the watering operation commences. This is repeated for each of the groups of sprinklers 100 in the system.

In one embodiment, each of the sprinklers 100 include at least one valve 160 to control the flow of water through the sprinkler 100. As a result, the valves 304 are no longer needed in the system. Thus, in one embodiment, the valves 304 are removed from the system or left in their opened position. The signal 309 is then directed to the controller 274, and the controller 274 controls the valves 160 in the sprinklers 100 to perform the desired watering operation.

The system controller 274 can also detect when the irrigation controller 306 closes one of the valves 304 using the same techniques described above. When the closing of the valve 304 is detected, the system controller 274 deactivates the one or more sprinklers 100 being fed water by the valve 304.

In accordance with a more specific embodiment, the system controller 274 provides power and control signals to the one or more sprinklers 100 through one or more wired connections 280 to the sprinklers 100. The power may be used to charge a capacitor or other power supply 175. Upon initial detection of the opening of one of the valves 304, the system controller 274 turns on the power to the corresponding one or more sprinklers 100 being fed water by the opened valve 304. In one embodiment, the sprinklers 100 are initially turned on for a set period of time to charge up the power supply 175. The system controller 274 then sends a command to the one or more sprinklers 100, which is acknowledged by the controllers 164 of the sprinklers 100. After the acknowledgement is received by the system controller 274, the system controller 274 sends watering instructions to each of the one or more sprinklers 100 in the group. The one or more sprinklers 100 in the group acknowledge receipt of the watering instructions. The system controller 274 then activates the group of sprinklers 100 and each of the sprinklers 100 in the group begins to execute their watering instructions. When the irrigation controller 306 closes the valve 304, the system controller 274 sends a command to the one or more sprinklers 100 in the group to stop the watering operation and the controllers 164 of the sprinklers 100 acknowledge receipt of the instruction. The system controller 274 then provides sufficient power for each of the sprinklers 100 in the group to close their one or more valves 160 before deactivating the sprinklers 100 in the group. This process is then continued for each group of one or more sprinklers 100 associated with each of the valves 304.

Some embodiments are directed to manufacturing a rotary sprinkler formed in accordance with one or more embodiments described herein. In one embodiment, this involves designing the nozzles 104 using Equations 1-5 described above to optimize the design for best watering uniformity. These equations provided the mathematical correlation between the ring spacing determined by the variable m and the ring-to-ring ratio determined by variable a. As mentioned above, it has been empirically found that an m=91 provide good watering uniformity for one embodiment. The stream distance for each nozzle is set by the nozzle trajectory based on each nozzle having the same trajectory velocity. Another step in achieving uniformity is having the same velocity and flow characteristic in multiple nozzles over a range of pressures, such as up to 40 psi for a 40 foot throw distance in one embodiment. In some embodiments, this is achieved by making sure that the tube portion of each nozzle is long enough to provide a turbulent flow inside of the nozzle tube up to 40 psi and setting the length of each nozzle to achieve the same velocity. If the nozzle length is too short, cavitation appears at high pressure and disrupts the uniformity of the stream as mentioned above.

In some embodiments, the method for designing or manufacturing a nozzle head 102 of the type embodied herein comprises one or more of the following method steps described below. In some embodiments, a maximum water throw distance is determined for the sprinkler based on the maximum available water pressure, and the water velocity needed to achieve the maximum throw distance based on a given trajectory angle, such as 30 degrees. In some embodiments, the overall nozzle diameter needed to achieve the maximum throw distance given the water velocity and trajectory angle is determined. This diameter sets the overall area of all of the nozzles combined. In some embodiments, the water discharge velocity is computed based on the change in diameter and velocity from inside the water supply to that inside of the nozzle. In some embodiments, Equations 1-5 are used to map out a set of 8 or more nozzles that achieve the goal of uniform water distribution across the entire watering field. The size of inner ring nozzles may be limited due clogging. Inner ring nozzles may also be made to stream less in order to spread the water more evenly at short radial distances from the nozzle head 102.

In some embodiments, Darcy's formula is used compute the length of the largest diameter nozzle using the pressure difference needed to achieve the maximum velocity at the maximum psi, for example 40 psi of dynamic pressure and 39 fps and 12.5 psi of pressure difference or drop in one embodiment. Using the same pressure difference, the lengths of the remaining nozzles are computed to achieve the same water discharge velocity for all of the nozzles.

In some embodiments, the trajectory angle of each nozzle is computed using Equations 1-5 based on the radial distance that the discharged water stream is to travel and the height of the nozzle above the ground.

When combined with a digitally controlled valve and digitally controlled rotor within which the nozzle is mounted, the water flow through the nozzle head can be adjusted and the speed of rotation adjusted together to water a complex landscape shape achieving a uniform water distribution much like rainfall.

Additional embodiments of the invention are directed to a watering method using the sprinkler 100 formed in accordance with one or more embodiments described above. In some embodiments, the sprinkler 100 stores a series of points around a watering pattern, such as in memory 166. Each point consists of an angular position for the head 102 corresponding to the point, and distance 146 for the outer extent of the watering position. The distance 146 determines a position of the valve 160, such as an angular position of a ball valve, for example, to set the water flow through the head 102. As discussed above, the motor 129 controls the angular position of the head 102 and the motor 162 controls the position of the valve 160. The controller 164 can access the angular head position and watering distance information associated with each point in the watering pattern from memory 166, or other memory.

In some embodiments, an electrical stepper motor and/or an electrical motor with an encoder, is used for the motor 129 and the motor 162. The angular position of the head 102 and the position of the valve are set based on a number of steps or an encoder position (hereinafter "steps") of each motor from an origin or home position. In one embodiment, the home position for the valve 160 is set to the closed position of the valve 160.

In some embodiments, the motor 129 and/or 162 has a high resolution of steps on the order of 10,000 to provide accurate control. While it might be typical to step the radial position at a fixed frequency while adjusting the valve position for a landscape or watering pattern, it turns out this method does not provide an accurate result due, in part, to the position of the valve 160 lagging the radial position of the head 102.

In some embodiments, the sprinkler 100 provides a uniform precipitation rate over a given watering cone 137 (FIG. 2) by adjusting the speed of rotation of the head 102 in response to a change in the projected water distance 146. That is, for a set position of the valve 160, the controller 164 increases a radial stepping frequency of the motor 129 to increase the speed of the rotation of the head 102 as the projected water distance 146 gets shorter, and decreases the radial stepping frequency of the motor 129 to decrease the speed of the rotation of the head 102 as the projected water distance gets longer. The controller 164 also adjusts the position of the valve 160 in order to discharge the water from the head 102 the desired distance 146.

It is difficult to accurately control of the rotational velocity of the head 102 and the position of the valve 160 due to the seals formed between the moving bodies of the sprinkler 100 and the valve 106. For instance, frictional resistance between the O-rings or other sealing members positioned within the channels 215 (FIG. 6) and 201 (FIG. 7) and the interior walls of the rotatable support 200 and the pedestal support 182, tends to inhibit rotational movement of the rotatable support 200. Additionally, when the valve 160 is a ball valve, seals within the valve 160 may inhibit rotation of the gear 196, which drives the position of the valve 160, particularly in inexpensive ball valve designs. As a result, driving the motor 129 or the motor 162 a certain number of steps does not result in a consistent amount of rotational movement of the rotatable support 200 or the gear 196, due to the frictional resistance.

Additionally, some embodiments of the sprinkler 100 include one or more gear trains, such as gears 210 and 216 coupled to the motor 129, and gears 194 and 196 coupled to the motor 162, which provide mechanical advantage in turning the head 102 and the valve 160 against the friction described above. When the valve 160 or head 102 are turning in a given direction torque builds up in the gear train such that when the direction is reversed, no movement is made until after the motors are driven a number of steps. In one embodiment, a change in direction is accompanied by an additional number of steps in order to release the torque in the drive train and achieve an accurate movement in the reverse direction.

In some embodiments, each movement of the sprinkler head 102 and the valve 160 are taken as macro steps. That is, rather than driving small incremental movements of the head 102 and the valve 160, the controller 164 drives larger movements using the motors 129 and 162 followed by an appropriate pause in the movement. For instance, for each 10 steps of the radial position stepper motor 129, the position of the valve 160 is calculated based on the programmed watering pattern. The calculation in this example is derived from a straight line between 2 programmed points in the landscape, but another calculation could be used. Empirically, it has been found that larger movements of the valve 160 and the head 102 were advantageous at overcoming the frictional resistance described above. In the case of the valve 160, larger movements overcame the friction inherent in inexpensive ball valve designs. In the case of the rotation of the head 102, driving slow rotation of the head 102 using the motor 129 over large rotational angles caused heat to build up in the motor 129 due to the continuous load on the electric motor 129. The frictional resistance to the rotational movement of the head 102 as well as the heat issues, are overcome by driving the motor 129 are larger number of steps over a shorter period of time.

In some embodiments, when the sprinkler 100 begins operation, the angular position of the head 102 and the position of the valve 160 are set to home positions. In some embodiments, the home position for the valve 160 is a nearly open position. Afterwards, the sprinkler controller 164 accesses a series of landscape points or coordinates from the memory 166 comprising the angular position of the head 102 from its home position, and a watering distance 146 (e.g., position of the valve 160) to which the sprinkler 100 is to deliver water, for a plurality of points that define the watering pattern for the sprinkler 100.

In some embodiments, formulas, such as sine based formulas, are stored in the memory 166 and used by the controller 164 to translate a rotational position of the head 102, and/or a number of inches in watering extent 146, to the number of steps the motors 129 and 162 must respectively be driven to provide the desired rotation of the head 102 and set the valve 160 to the position required to provide the desired water flow. The formulas allows the rotational position of the head 102 and the watering distance 146 to be stored in the memory 166 for later conversion by the formulas using the controller 164. Likewise, steps for the motor 129 and the motor 162 may be converted back to rotational movements and watering distances using the formulas in order to save the angular locations and distances of programmed landscape points.

Figure 13:
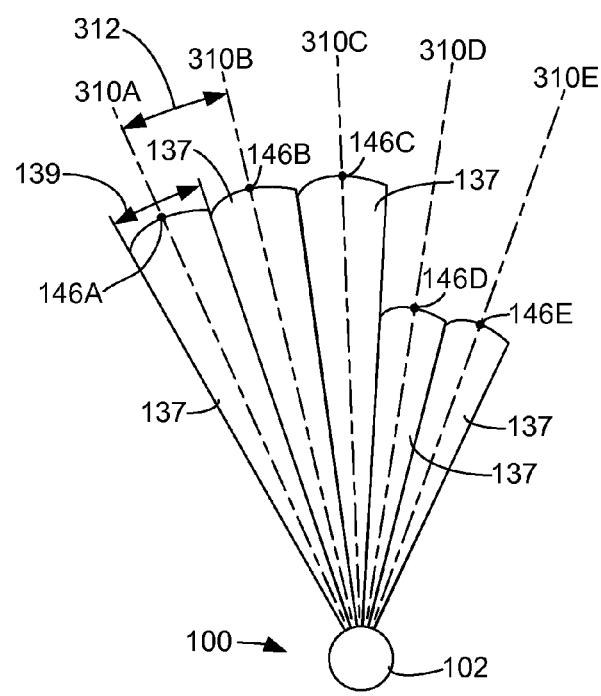
FIG. 13 is a simplified top view of a sprinkler watering a pattern in accordance with embodiments of the invention.

Once the head 102 and the valve 160 are in the home positions, the first landscape point is read from the memory 166 using the controller 164, which indicates a first watering distance 146A, to which the sprinkler 100 is to deliver water, and a first angular position 310A for the head 102, as shown in the simplified top view of the sprinkler 100 provided in FIG. 13. If the watering distance 146A is not in terms of a position of the valve 160 or steps from the home position, the controller 164 can translate the watering distance 146A as necessary using, for example, a look-up table or a formula. Likewise, if the first angular position 310A is not in terms of steps from the home position, the controller 164 performs any necessary conversion using, for example, a look-up table or formula. The controller 164 drives the motor 129 a number of steps to position the head 102 at first angular position 310A. In some embodiments, the controller 164 drives the motor 162 a number of steps to move the valve 160 to the position corresponding to the first watering distance 146A.

Figure 14:
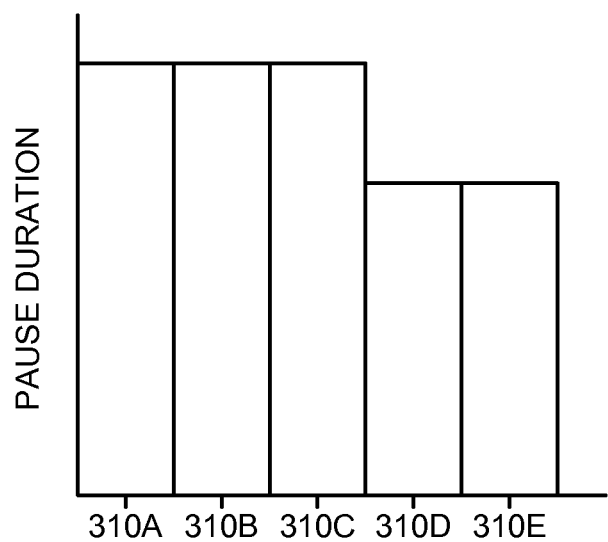
FIG. 14 is a chart illustrating pause durations or holding time periods for each of the angular positions of the head shown in FIG. 13.

In some embodiments, the head 102 is held in each of the angular positions designated by the landscape points to provide the desired watering over the pattern. This holding time period or pause duration relieves the motors 129 and/or 162 of a continuous load, thereby saving power and reducing heat generation. For instance, the head 102 may be held in the first angular position 310A for a first time period based on the watering distance 146A. The period of time at which the head 102 is maintained in its position as water is discharged from the head 102 is longer for longer watering distances 146 and shorter for shorter watering distances 146, as indicated in the chart of FIG. 14, which lists pause durations or holding time periods for each of the angular positions of the head shown in FIG. 13. This ensures substantially uniform watering for portions of the watering pattern having different watering distances 146. In some embodiments, the holding of the head 102 in a given angular position involves driving the motor 129 for a period of time to ensure that the actual movement of the motor 129 and corresponding gear train have taken place before the power is terminated to the motor 129.

In some embodiments, the controller 164 determines the next angular position 310B for the head 102 and the next watering distance 146B for the valve 160 from the second landscape point. In some embodiments, the angular positions 310 of the head 102 are spaced from each other a set angular distance 312 corresponding to the angle 139 (e.g., 2-3 degrees) of the watering cone 137 covered by the spray pattern from the one or more nozzles 104 of the head 102, as shown in FIG. 13. In preferred embodiments, the angular distance 312 is less than the angle 139 of the watering cone 137, such as 0.5-1 degree. As a result, the watering cone 137 discharged from the head 102 at various angular positions 310 will overlap a portion of the watering cones 137 discharged from adjacent angular positions 310 of the head 102. For instance, in some embodiments, the watering cone 137 discharged from the head 102 covers a wider angular area than that depicted in the simplified illustration of FIG. 13, such that the watering cone 137 discharged while the head 102 is in angular position 310A is overlapped by the watering cone 137 discharged from the head 102 while in the angular position 310B.

In some embodiments, the controller 164 holds the head 102 in the second angular position 310B for a second time period. The method progresses through the third landscape point (head angular position 310C, watering distance 146C) in the same manner.

The fourth landscape point (head angular position 310D, watering distance 146D) provides a change in the watering distance 146D. In some embodiments, when the targeted distance 146 of the next landscape point is less than the current targeted distance 146, the position of the valve 160 is adjusted prior to rotating the head 102 to the next position, and when the targeted distance 146 of the next landscape point is greater than the current targeted distance 146, the position of the valve 160 is adjusted after rotating the head 102 to the next position. For the transition from position 310C to 310D, the watering distance is decreased. Therefore, the controller 164 adjusts the position of the valve 160 based on the distance 146D prior to rotating the head 102 to the position 310D, in some embodiments. The head 102 is maintained at the angular position 310D for a fourth period of time that is determined based on the distance 146D, before the controller 164 adjusts the position of the head 102 to the angular position 310E corresponding to the fifth landscape point for a fifth time period.

This movement of the head 102 continues until a single pass of the watering pattern is completed. The process can then repeat until the desired watering of the pattern is complete.

Although the present invention has been described with reference to preferred embodiments, workers skilled in the art will recognize that changes may be made in form and detail without departing from the spirit and scope of the invention.

What is claimed is:

1. A method of watering a continuous area using a rotary sprinkler, which includes a head having a plurality of nozzles that are configured to discharge water streams along a radial line from the head, the method comprising:

watering a first sector of the continuous area radially extending a first watering distance from the head comprising:
- non-continuously rotating the head to each of a plurality of first angular positions corresponding to the first sector;
- discharging water from the nozzles over a plurality of first watering cone portions of the first sector each corresponding to one of the first angular positions; and
- holding the head at each of the plurality of first angular positions for a first time period, which is based on the first watering distance; and watering a second sector of the continuous area adjoining the first sector and radially extending a second watering distance from the head that is different from the first watering distance comprising:
- non-continuously rotating the head to each of a plurality of second angular positions corresponding to the second sector;
- discharging water from the nozzles over a plurality of second watering cone portions of the second sector each corresponding to one of the second angular positions; and
- holding the head at each of the plurality of second angular positions for a second time period, which is based on the second watering distance and is different from the first time period.

2. The method according to claim 1, wherein non-continuously rotating the head comprises driving a first electric motor using a controller.

3. The method according to claim 2, wherein holding the head comprises terminating electrical power to the first electric motor.

4. The method according to claim 3, wherein the first electric motor comprises a stepper motor.

5. The method according to claim 2, wherein discharging water from the nozzles over the plurality of first watering cone portions of the first sector comprises positioning a valve in a first valve position including driving a second electric motor using the controller.

6. The method according to claim 5, wherein discharging water from the nozzles over the plurality of second watering cone portions of the second sector comprises positioning the valve in a second valve position including driving the second electric motor using the controller, wherein the first and second valve positions are different.

7. The method according to claim 5, wherein the second electric motor comprises a stepper motor.

8. The method according to claim 6, wherein:
the first watering distance is greater than the second watering distance; and
positioning the valve in the second valve position occurs before the head is rotated from a last of the first angular positions to a first of the second angular positions.

9. The method according to claim 1, wherein adjoining first and second angular positions are separated by 0.5-1 degree.

10. The method according to claim 1, wherein:
the head comprises at least 8 nozzles;
the nozzles are configured to discharge water streams at substantially the same speed; and
each of the water streams is discharged a different radial distance from the nozzle.

11. The method according to claim 10, wherein each water stream produces a spray pattern that overlaps at least one adjoining spray pattern from one of the nozzles.

12. The method according to claim 1, wherein a period of time that the head is held in an angular position that is between adjoining first angular positions or adjoining second angular positions is less than the first and second time periods.

* * * * *